June 2, 1942. T. H. SVENDSEN 2,284,997
FUEL INDICATOR
Filed Dec. 11, 1939
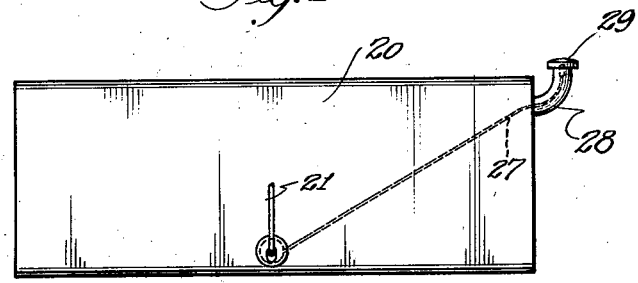
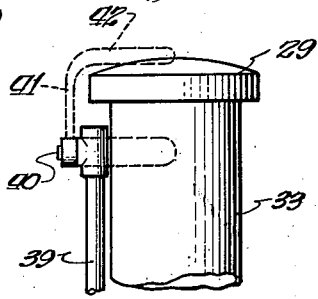
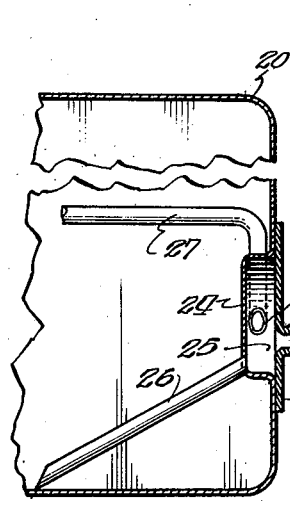
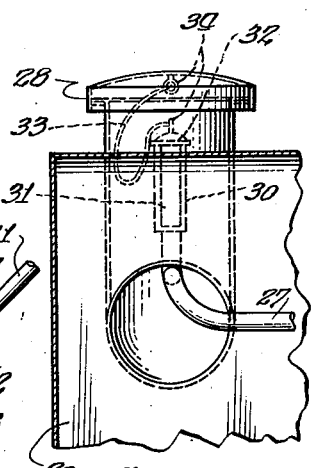
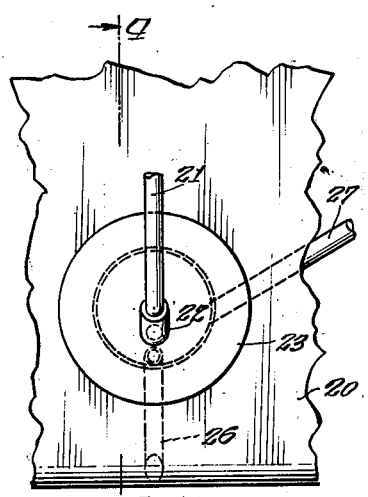
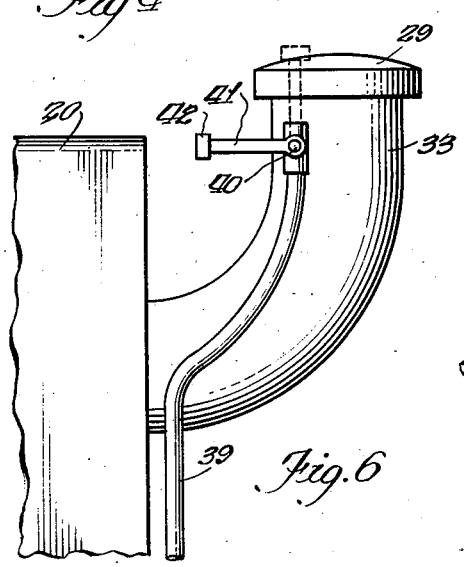
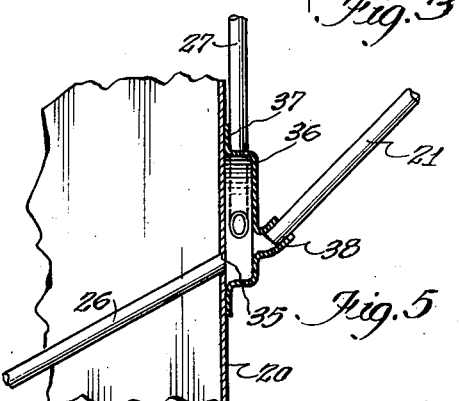
Inventor:
Trygve H. Svendsen
By: Stevens & Batchelor
Atty's Patented June 2, 1942

2,284,997

UNITED STATES PATENT OFFICE 2,284,997

FUEL INDICATOR

Trygve H. Svendsen, Chicago, Ill.

Application December 11, 1939, Serial No. 308,719

3 Claims. (Cl. 158—46.5)

My invention relates to fuel indicators, and is more particularly an improvement on the indicator patented by Frank S. Wattells under No. 2,020,593, one object of the improvement being to concentrate the mechanism of the indicator in the zone of the fuel tank of the automobile to which the indicator is applied.

A further object of the invention is to build the device into or upon the wall of the fuel tank, whereby to avoid making a large opening for the insertion of the device into the tank.

A still further object of the invention is to extend the device from the tank into the filler-neck thereof for purposes of control.

Another object of the invention is to provide means in connection with the filler-neck and cap of the fuel tank to preclude error in the operation of the control referred to.

An important object of the invention is to design the improved device so that it is easily applicable to fuel tanks either in the manufacture thereof or by application thereto.

With the above objects in view and any others which may suggest themselves from the description to follow, a better understanding of the invention may be had by reference to the accompanying drawing, in which—

Fig. 1 is a front elevation of a typical automobile fuel tank, showing the position of the improved indicator;

Fig. 2 is an enlarged section taken on the line 2—2 of Fig. 1;

Fig. 3 is an elevation of so much of the device as is seen in the lower center of Fig. 1, and on a magnified scale;

Fig. 4 is a section substantially on the line 4—4 of Fig. 3;

Fig. 5 is a view similar to Fig. 4, showing a modification of the device;

Fig. 6 is an elevation of a modification in the control as applied to the filler-neck of the fuel tank; and Fig. 7 is a side view of the upper portion of Fig. 6 as seen from the right.

In the aforesaid patent, the regular fuel line from the pump of the automobile leads into one side of a chamber forming the main portion of the device, while a tube from the opposite side of the chamber leads forward to a point in front of the dash with a controllable outlet. Thus, when the fuel in the tank falls to a level considered as low, it departs from the fuel line, opening communcation between the same and the aforesaid opened tube, so that only air is drawn into the fuel line and the engine of the automobile comes to a stop because of the lack of fuel, this being an indication that the fuel level is low. The closing of the air tube in the region of the dash—either by means of a valve or by placing a finger over it—checks the supply of air to the fuel line, so that the same can again draw upon the fuel reserve, this being a warning to the driver to replenish the fuel in the tank.

In the present case, 20 denotes the fuel tank and 21 the fuel line entering the frontal side of the tank near the bottom. Instead of passing into the tank to meet the indicator chamber, the fuel line 21 enters a coupling 22 forming part of a plate 23 which is secured by welding or other suitable means to make a tight joint with the front wall of the tank. Such wall is pressed with a cup formation 24 immediately behind the plate 23 in order to combine with the latter to form the indicator chamber 25.

A tube 26 continues from the bottom of the chamber 25 to the bottom of the tank, as in the patented structure. However, the other tube leading from the chamber—that is, the air tube 27—starts from a lateral point in the chamber, as indicated at 27a and rises through the tank in accordance with the dotted lines in Fig. 1 to enter the filler-neck 28, the latter receiving the usual closure cap 29.

The upper end of the air tube 27 is enlarged to form a receptacle 30 for a stopper pin 31 carried by a small cap 32. This cap is connected to the center of the filler cap 29 by a chain or cord 33, the two caps having suitable eye-fittings 34 for the attachment of the chain or cord.

Ordinarily, the stopper pin 31 is lifted out of the receptacle 30 of the air tube 27 and hangs alongside the latter in the filler-neck. The operation of the indicator is therefore the same as in the aforesaid patent. However, when the fuel shortage is manifested by the stoppage of the engine, the driver simply steps out of the car, and removes the fuel cap 29, raising the same to a point at which the depending pin 31 can be grasped. The pin is now inserted into the receptacle 30, as indicated in Fig. 2 and the filler cap 29 replaced. The supply of fuel to the engine will now be resumed, and when a stop is made at a fuel station, the removal of the filler cap 29 by the attendant will automatically pull the pin 31 out of the receptacle 30, so as to again render the air tube 27 open at the top, restoring the normal position of the indicator.

It will be apparent that the chamber 25, formed as indicated in Fig. 4, is easily produced while the fuel tank is made, only requiring the same to be pressed with the indented portion and to receive the outer plate 23 in a manner to seal the said portion. The chamber is thus provided with far greater facility than in the aforesaid patent. However, the device is as easily applicable to existing fuel tanks by the construction indicated in Fig. 5. In this instance, it is only necessary to bore a small hole in the tank at 35 for the insertion and fastening of the fuel supply tube 26. Then, the chamber is formed by an outer cup 36 having a rim flange 37 which is soldered, brazed or welded to the wall of the tank, the cup having a coupling 38 corresponding to and for the same purpose as the coupling 22 in the said embodiment.

I have also evolved a modification for the air tube 27 in cases where it is not desirable to run the same up through the filler-neck 28. As shown in Figs. 6 and 7, the air tube is led out of the tank as indicated at 39 and trained upwardly to a position closely alongside the filler-neck 33. The upper end of the tube is fitted with a valve 40 which is open when its operating lever 41 is in the horizontal or full-line position, such operating lever having a lateral arm 42. However, when the low fuel emergency arises and the air supply to the tube 39 is to be closed, the lever 41 is swung upwardly to the position indicated by dotted lines in Fig. 6, closing the valve. The indicator is now set until the fuel in the tank is to be replenished, at which time the fuel station attendant finds that the arm 42 of the lever 41 closely over-lies the filler cap 29, as indicated by the upper dotted lines in Fig. 7. In order to remove the filler cap, the attendant must swing the arm 42 aside, this action causing the lever 41 to again open the valve, making it certain that this has occurred before the car is again on its way. Thus, the expedience of the pin 31 and the valve arm 42 are provided as safeguards to assure the restoration of the indicator to normal position after the fuel is replenished.

It will be evident from the above description that I have provided an improvement in the fuel indicator which renders it more easily and cheaply adaptable to automobile fuel tanks. Thus, while the device is easily included as part of the fuel equipment in a new car, the modified form of chamber makes it possible to attach it in the manner of an accessory to existing fuel tanks and making the device available to a large number of automobile owners. Further, by concentrating the construction of the improved device, it extends only to the zone of the fuel tank, saving the expense of running the air tube to the dash of the automobile. While this was considered a convenience in the patented structure, the average driver would not hesitate to step out and attend to the air tube control in the event of a low fuel emergency. In fact, in the case of trucks the fuel tank is often in a very handy position, involving no inconvenience for the driver to reach the air tube. Finally, the improved device is still composed of few parts which are easy to produce by ordinary factory methods, involve no fine operations or adjustments, and may be in operation indefinitely without the need of attention or repair.

While I have described the improvement along specific lines, various minor changes and refinements may be made without departing from its principle, and I desire to consider all such changes and refinements as coming within the scope and spirit of the appended claims.

I claim:

1. A fuel indicator for a power plant including an internal combustion engine and a fuel tank therefor; comprising an indicator chamber on a wall of said tank intermediate the top and bottom of said tank, said chamber being formed by a wall portion of said tank and by a separate member secured thereto, a suction pipe leading from said chamber to the engine, a second suction pipe leading from the bottom of said tank to said chamber, a normally open air supply tube having one end opening into said chamber and a free end exposed to the atmosphere, means for opening and closing said tube, said tank having a filling opening and a closure cap therefor, said tube leading from said chamber through said tank to said filling opening and terminating therein adjacent said cap, said means for opening and closing said tube, comprising a plug insertable in the free end of said tube to close the same, and means connecting said plug to said cap whereby said plug is removed from said tube to open the same when said cap is removed from said opening.

2. A fuel indicator for a power plant including an internal combustion engine and a fuel tank therefor; comprising an indicator chamber on a wall of said tank intermediate the top and bottom of said tank, said chamber being formed by a wall portion of said tank and by a separate member secured thereto, a suction pipe leading from said chamber to the engine, a second suction pipe leading from the bottom of said tank to said chamber, a normally open air supply tube having one end opening into said chamber and a free end exposed to the atmosphere, means for opening and closing said tube, said tank having a filling opening and a closure cap therefor, said tube leading from said chamber through said tank to said filling opening and terminating therein adjacent said cap, said means for opening and closing said tube, comprising an element adapted to slidably engage with the free end of said tube to close the same, and means connecting said element to said cap whereby said element is removed from said tube to open the same when said cap is removed from said opening.

3. A fuel indicator for a power plant including an internal combustion engine and a fuel tank therefor; comprising an indicator chamber on a wall of said tank intermediate the top and bottom of said tank, said chamber being formed by a wall portion of said tank and by a separate member secured thereto, a suction pipe leading from said chamber to the engine, a second suction pipe leading from the bottom of said tank to said chamber, a normally open air supply tube having one end opening into said chamber and a free end exposed to the atmosphere, means for opening and closing said tube, said tank having a filling opening and a closure cap therefor, said tube leading from said chamber through said tank to said filling opening and terminating therein adjacent said cap, said means for opening and closing said tube, comprising an element adapted to slidably engage with the free end of said tube to close the same, and means connecting said element to said cap whereby said element is removed from said tube to open the same when said cap is removed from said opening, said connecting means comprising a flexible member.

TRYGVE H. SVENDSEN.